US 7,490,016 B2

(12) United States Patent
Min et al.

(10) Patent No.: US 7,490,016 B2
(45) Date of Patent: Feb. 10, 2009

(54) METHOD AND APPARATUS FOR CALIBRATING POSITION OF IMAGE SENSOR, AND METHOD OF DETECTING POSITION OF IMAGE SENSOR

(75) Inventors: Dong-ki Min, Yongin-si (KR);
Sung-hoon Choa, Yongin-si (KR);
Seung-bum Hong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/828,516

(22) Filed: Jul. 26, 2007

(65) Prior Publication Data
US 2008/0109182 A1 May 8, 2008

(30) Foreign Application Priority Data
Nov. 6, 2006 (KR) .................... 10-2006-0108834

(51) Int. Cl.
*G01C 25/00* (2006.01)
(52) U.S. Cl. .................... 702/104; 702/94; 250/231.13; 356/28
(58) Field of Classification Search ............... 702/104, 702/94, 95; 250/231.13; 356/28
See application file for complete search history.

(56) References Cited

U.S. PATENT DOCUMENTS 5,970,181 A * 10/1999 Ohtsu ..................... 382/274
5,988,506 A * 11/1999 Schaham et al. ......... 235/462.1
6,248,994 B1 * 6/2001 Rose et al. ............. 250/231.13

\* cited by examiner

*Primary Examiner*—Tung S Lau
*Assistant Examiner*—Hien X Vo
(74) *Attorney, Agent, or Firm*—Sughrue Mion, PLLC

(57) ABSTRACT

A method and apparatus for calibrating a position of an image sensor, and a method of detecting the position of an image sensor are provided. The method of calibrating the position of an image sensor includes: obtaining first image information corresponding to a first position of the image sensor and obtaining second image information corresponding to a second position of the image sensor, calculating cross-correlation values between the obtained first image information and second image information; determining whether or not the calculated cross-correlation values are symmetrical; setting a driving power value of the image sensor for moving the image sensor the distance between the first position to the second position as a reference driving power value for moving the image sensor one-pixel distance, if it is determined that the cross-correlation values are not symmetrical; and calibrating the position of the image sensor by using the set driving power value.

20 Claims, 10 Drawing Sheets

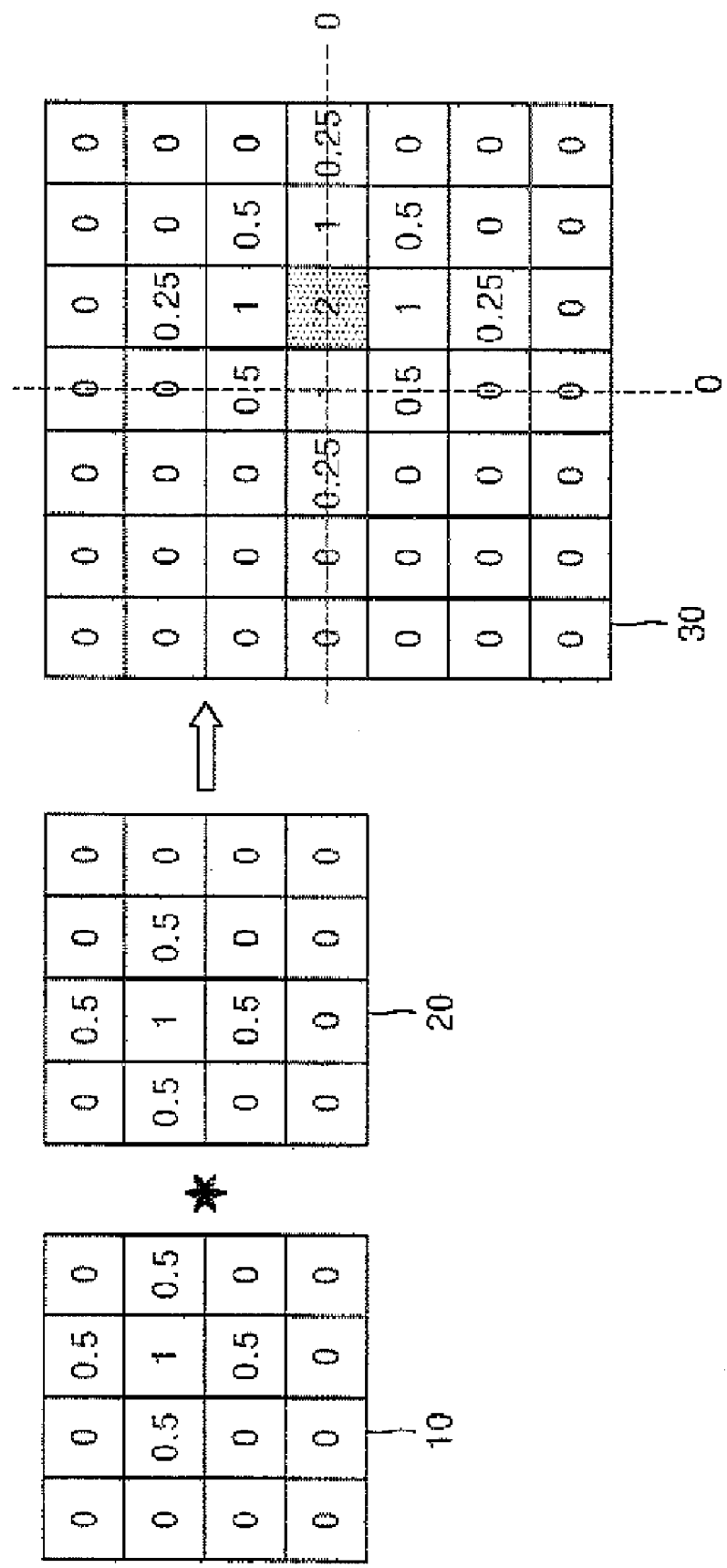

ORIGINAL IMAGE

CAPTURED ORIGINAL IMAGE

SHIFTED IMAGE

CROSS-CORRELATION

METHOD AND APPARATUS FOR CALIBRATING POSITION OF IMAGE SENSOR, AND METHOD OF DETECTING POSITION OF IMAGE SENSOR

CROSS-REFERENCE TO RELATED PATENT APPLICATIONS

This application claims priority from Korean Patent Application No. 10-2006-0108834, filed on Nov. 6, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to calibrating a position of an image sensor and detecting the position of an image sensor, and more particularly, to calibrating a position of an image sensor in order to improve the resolution and quality of an image obtained through the image sensor and detecting the position of an image sensor.

2. Description of the Related Art

An image sensor is an apparatus for obtaining one-dimensional or multi-dimensional digital image information from an image source. Image sensor types broadly include an image pickup tube and a solid-state imaging device. The image pickup tube is an electronic tube with a special shape emitting an electronic beam, and the solid-state imaging device is a device in which a photo sensing device and an emission circuit are integrated onto a semiconductor substrate.

The solid-state imaging device has been developed to replace the image pickup tube that is mainly used for televisions, and includes a metal oxide semiconductor (MOS) and a charge-coupled device (CCD).

Due to a recent trend in the market for apparatuses capable of photographing images, such as digital cameras, digital camcorders, mobile phones, and personal digital assistants (PDAs), the demand for high resolution and high quality images has increased.

A method of increasing the resolution or quality of an image sensor is accomplished by increasing the number of pixels. The size of the semiconductor device needed for a particular number of pixels also increases in proportion to the increase in the number of pixels, thereby increasing the cost and the size of the image sensor. If the size of a unit pixel is reduced and as such, the number of pixels is increased, the sensitivity of the pixels also decrease with the decrease in size of the pixels due to technological limitations.

In addition to the method of increasing the resolution or quality of an image sensor, a moving image sensor has been suggested in which the resolution or quality of an image is improved by moving the moving image sensor.

FIG. 1A illustrates a related art moving sensor in which a micro-lens array (MLA) 1, a color filter array 2, a metal opaque layer 3, a photodiode 4, a silicon substrate 5, and a scanner 6 are integrally formed.

FIG. 1B illustrates a related art structure of a moving image sensor in which a laminate consisting of the MLA 1, the color filter array 2, and the scanner 6 and a laminate consisting of the metal opaque layer 3, the photodiode 4, and the silicon substrate 5 are separated and the former laminate is moved.

FIG. 1C illustrates a related art structure of a moving image sensor in which a laminate consisting of the MLA 1, the color filter array 2, and a support unit 7 and a laminate consisting of the metal opaque layer 3, the photodiode 4, the scanner 6, and the silicon substrate 5 are separated and the latter laminate is moved.

In the moving image sensor illustrated in FIG. 1A through 1C, the image sensors should be moved accurately to a desired position in order to improve the resolution and quality of an image. For example, if a moving image sensor with a size of one-pixel is moved, the quality of the image sensor can be improved, and if a moving image sensor with a size of ½-pixel is moved, the resolution of the moving image sensor can be improved.

In the related art technology, in order to move an image sensor to a desired distance, a position sensor, such as an electrostatic capacitance sensor, is separately used. However, in order for the position sensor to be used, the position sensor must compensate for a position error due to thermal drift or aging of a driving apparatus for the position sensor. The position sensor does not exhibit linear characteristics, and is costly.

There are image sensors that do not use the position sensor method. Such image sensors use position-tracking algorithms, such as an intensity interpolation method, a correlation coefficient curve-fitting or interpolation method, a Newton-Raphson iteration method, a double Fourier transform method, and gradient-based methods. However, the related art methods involves complicated calculations for at least one of position tracking and calibrating of an image sensor.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of calibrating a position of an image sensor, a method of detecting the position of an image sensor, and an apparatus for calibrating an image sensor, in which the position of an image sensor can be calibrated and detected in units of sub-pixels by using a simplified algorithm using the symmetric distribution characteristic of a cross-correlation of the position of the image sensor without disposing a separate position sensor. Thus, the accuracy of sensing the position of the image sensor can be improved.

According to an aspect of the present invention, there is provided a method of calibrating the position of an image sensor, the method comprising: obtaining first image information corresponding to a first position of the image sensor and obtaining second image information corresponding to a second position of the image sensor; calculating the cross-correlation values between the obtained first image information and second image information; determining whether or not the calculated cross-correlation values are symmetrical; setting a driving power value of the image sensor for moving the image sensor the distance between the first position to the second position as a reference driving power value for moving the image sensor one-pixel distance if it is determined that the cross-correlation values are symmetrical; and calibrating the position of the image sensor by using the set driving power value.

According to another aspect of the present invention, there is provided an apparatus for calibrating the position of an image sensor, the apparatus comprising: an image information acquisition unit which obtains first image information corresponding to a first position of the image sensor and obtains second image information corresponding to a second position of the image sensor; a driving unit which changes the second position of the image sensor according to a driving power value; a cross-correlation calculation unit which calculates the cross-correlation values between the first image information and the second image information; a symmetry determination unit which determines whether or not the cross-correlation values calculated in the cross-correlation calculation unit are symmetrical; a reference driving power value setting unit, which sets the driving power value of the image sensor for moving the image sensor the distance between the first position to the second position as a reference driving power value for moving the image sensor one-pixel distance if it is determined that the cross-correlation values are symmetrical; and a control unit which controls the driving power value to be provided to the driving unit by using the set driving power value.

According to another aspect of the present invention, there is provided a method of detecting the position of an image sensor, the method comprising: obtaining first image information corresponding to a first position of the image sensor and obtaining second image information corresponding to a second position of the image sensor; calculating the cross-correlation values between the obtained first image information and second image information; determining whether or not the calculated cross-correlation values are symmetrical; setting a driving power value of the image sensor for moving the image sensor the distance between the first position to the second position as a reference driving power value for moving the image sensor one-pixel distance if it is determined that the cross-correlation values are symmetrical; and detecting the position of the image sensor by using the set driving power value.

BRIEF DESCRIPTION OF THE DRAWINGS

The above and other aspects of the present invention will become more apparent by describing in detail exemplary embodiments thereof with reference to the attached drawings in which:

FIG. 2 is a diagram illustrating the concept of a cross-correlation value of image information;

FIGS. 4A through 4E are diagrams of simulations illustrating changes in the symmetrical characteristic of the cross-correlation values by moving the position of an image sensor;

DETAILED DESCRIPTION OF THE EXEMPLARY EMBODIMENTS OF THE INVENTION

Figure 1A:
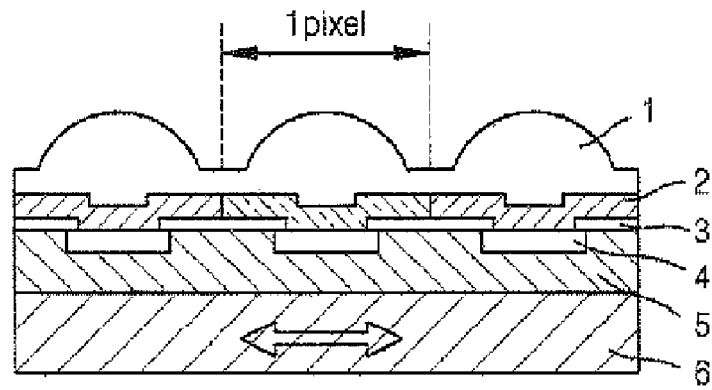
FIGS. 1A through 1C are diagrams illustrating structures of a related art moving image sensor.

A method and apparatus for calibrating the position of an image sensor, and a method of detecting the position of an image sensor according to the present invention will now be described more fully with reference to the accompanying drawings, in which exemplary embodiments of the invention are shown.

Exemplary embodiments of the present invention use the concepts of image cross-correlation and the symmetrical characteristic of the cross-correlation of the position of an image sensor. Before explaining the exemplary embodiments of the present invention, the concept of cross-correlation used in the present invention and the distribution characteristic of cross-correlation of the position of an image will now be explained.

FIG. 2 is a diagram illustrating the concept of a cross-correlation value of image information. FIG. 2 illustrates a data table 10 indicating first image information obtained from a first position, which is an original position, by an image sensor, a data table 20 indicating second image information obtained from a second position, which is arrived at by moving the image sensor exactly one-pixel distance, and a data table 30 indicating the cross-correlation of first and second image information sets. The cross-correlation of the first image information and the second image information indicates the degree to which correlation between the first and second image information sets occurs.

When the moved distance of the image sensor, that is, the distance from the first position to the second position, is the same as the size of one pixel or the size of a plurality of the pixels, the cross-correlation has a symmetric distribution, and the cross-correlation can be calculated according to Equation 1 below:

$$X_{fg}(k, h) = f * g = \sum_{i}^{P} \sum_{j}^{Q} f(i, j) \times g(i+k, j+h) \qquad \text{EQN. (1)}$$

Here, $f(i,j)$ is first image information of the first position of the image sensor, $g(i+k,j+h)$ is second image information of the second position of the image sensor, which is arrived at by moving the image sensor a distance $(k,h)$, $X_{fg}(k,h)$ is the cross-correlation function between the first image information and the second image information, and P and Q are the numbers of pixels of the images of which cross-correlation is to be calculated.

The result of calculating the cross-correlation between the first image information of data table 10 and the second image information of data table 20 according to Equation 1 is illustrated in data table 30. In data table 30, the part at which dotted lines intersect is the origin (0,0), and the maximum cross-correlation value of the first and second image information exists at point (1,0). If a peak of the cross-correlation values is detected, then, it can be confirmed that the position of the image sensor has moved one-pixel distance to the left. However, it is impossible to detect and calibrate the position of the image sensor in units of subpixels only through this discrete method. Accordingly, the distribution characteristic of a cross-correlation value should be considered as below.

Figure 3A:
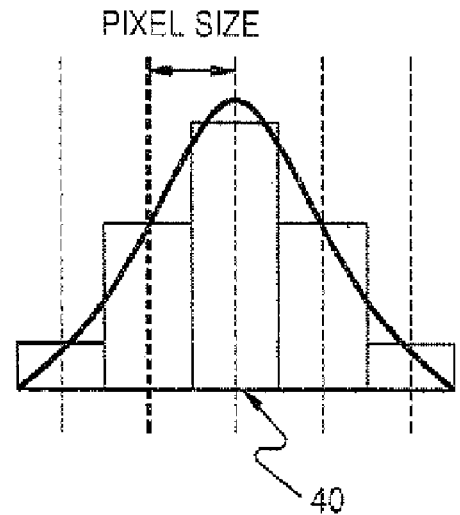
FIGS. 3A through 3C are diagrams illustrating distributions of cross-correlation values that differ by moving the position of an image sensor.
Figure 3B:
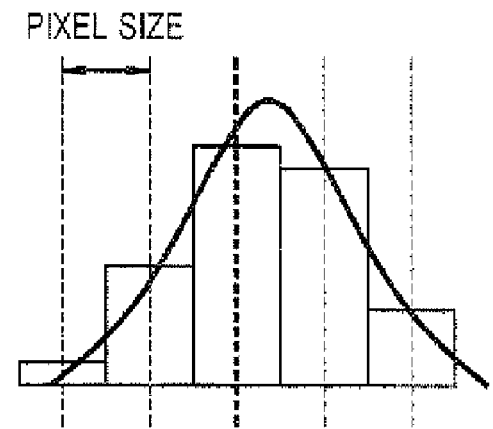
Figure 3C:
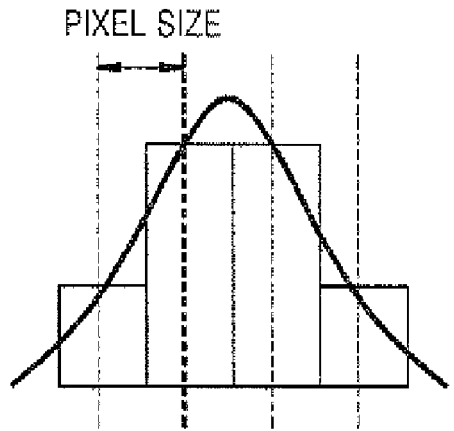

FIGS. 3A through 3C are diagrams illustrating distributions of cross-correlation values that differ by moving the position of an image sensor.

FIG. 3A illustrates the cross-correlation values of an image before and after moving the image sensor exactly one-pixel distance to the left. When the image sensor is moved exactly one-pixel distance to the left, the cross-correlation values have a symmetrical characteristic about the peak coordinates 40 of the cross-correlation values. In detail, the cross-correlation values of two points adjacent to a peak line and facing each other across the peak line have the same value and hence demonstrate a symmetrical characteristic. Accordingly, by determining whether or not the cross-correlation values have a symmetrical characteristic, a position, which is arrived at by moving the image sensor one-pixel distance, can be detected.

FIG. 3B illustrates the cross-correlation values of an image before and after moving the image sensor when the image sensor is moved in units of subpixels to the left. Unlike the case where the image is moved exactly one-pixel distance to the left, the cross-correlation values of points facing each other across the peak line do not demonstrate a symmetrical characteristic.

FIG. 3C illustrates the cross-correlation values of an image before and after moving the image sensor when the image sensor is moved exactly a ½-pixel distance to the left. Even when the distribution of the cross-correlation values illustrates symmetry and theoretically two peak points of cross-correlation values exist, errors in design and manipulation actually exist, and thus it is highly probable that one peak of cross-correlation values exists. Accordingly, also in this case, the symmetry of the distribution of cross-correlation values centering relative to the peak is not likely to occur.

FIGS. 4A through 4E are diagrams of simulations illustrating changes in the symmetrical characteristic of the cross-correlation values by moving the position of an image sensor. The simulations were performed by using a 30×30-pixel image sensor, an 8-bit analog-to-digital (AD) converter, and an image source having Gaussian intensity and emitting light to the central part of an image, and under a condition where Gaussian noise corresponds to 1% for 8-bit resolution.

Figure 4A:
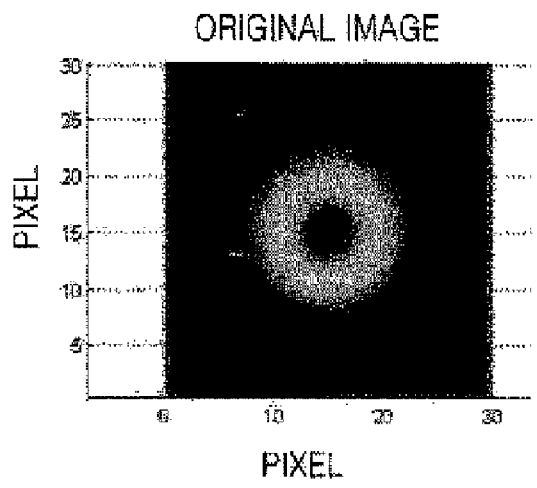
Figure 4B:
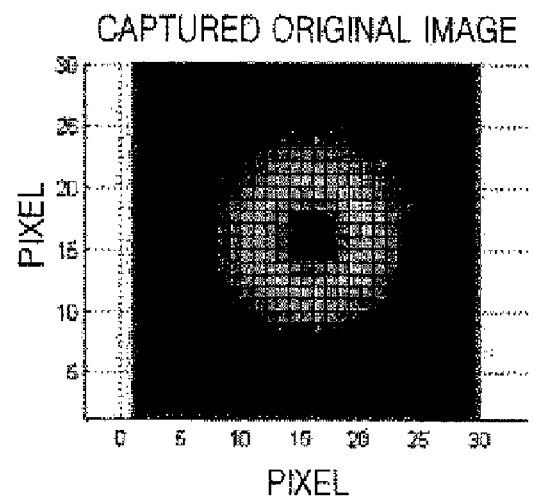
Figure 4C:
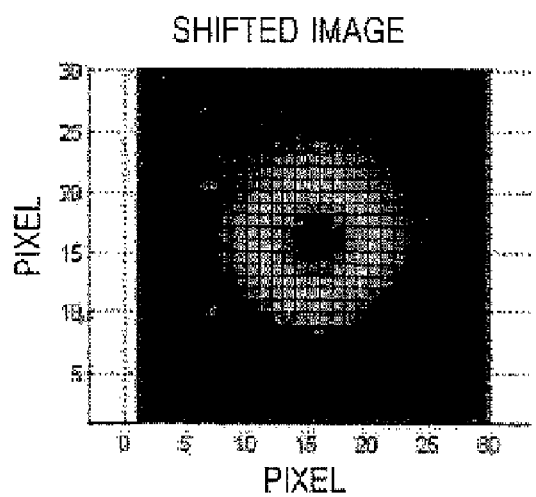
Figure 4D:
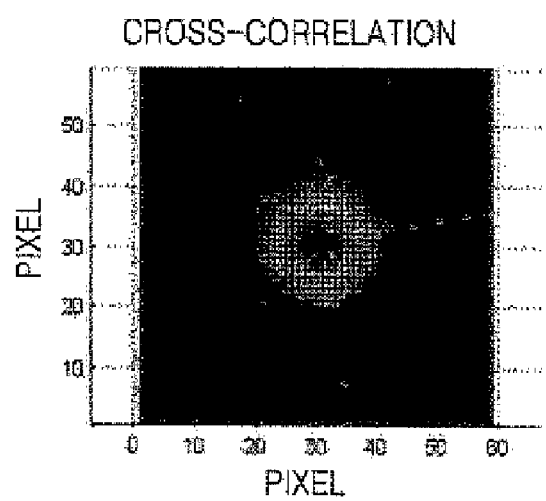
Figure 4E:
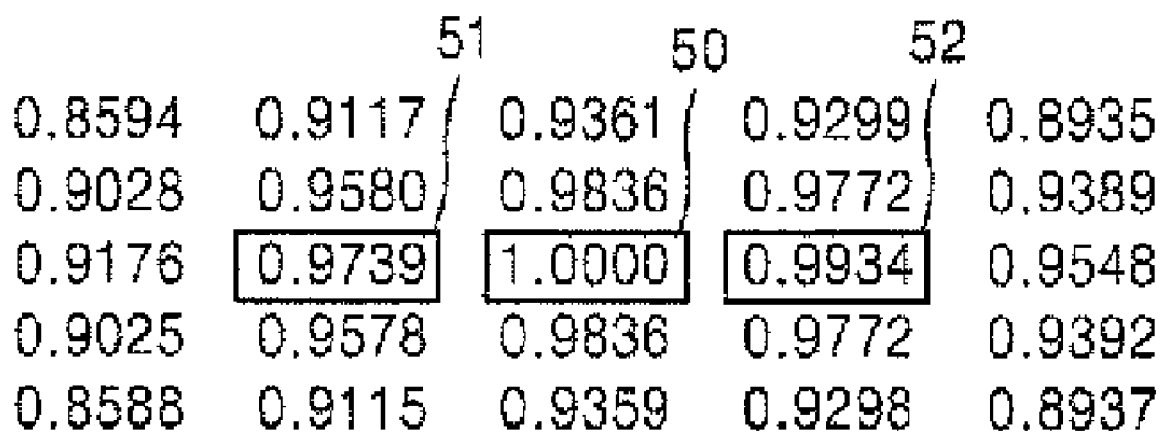

FIG. 4A illustrates image information of the image source. FIG. 4B illustrates image information obtained from the image source by the image sensor. FIG. 4C illustrates image information obtained from the image source by the image sensor after the image sensor is moved a 0.3-pixel distance to the left. FIG. 4D illustrates cross-correlation values calculated from the obtained image information illustrated in FIGS. 4B and 4C. FIG. 4E is a table illustrating the cross-correlation values around the coordinates illustrating the peak cross-correlation value in the simulations.

As illustrated in FIG. 4D, from among the cross-correlation values in the 59×59 pixels, the peak coordinates 50 having the maximum cross-correlation value are (30,30). Referring to FIG. 4E, the table illustrates values that are obtained by dividing cross-correlation values of respective coordinates by the maximum cross-correlation value. The cross-correlation value at the peak coordinates is 1.0000 (50), and for the adjacent coordinates to the peak coordinates, the cross-correlation values at coordinates (31,30) (52) and (29, 30) (51) are 0.9934 and 0.9739, respectively. The difference between the cross-correlation values of the coordinates (29, 30) and (31,30) (0.9739−0.9934=−0.0195) is output as a signal that can be recognized externally by using a voltage sensor, and thereby allowing the position of the image sensor to be detected.

Since the image sensor is moved to the left in this simulation, the cross-correlation distribution illustrates symmetry in the Y-axis direction, but does not illustrate symmetry in the X-axis direction.

The present invention can estimate the position which is arrived at by moving an image sensor one-pixel distance, by using the symmetrical characteristic of the distribution of the cross-correlation values of surrounding coordinates adjacent to the peak coordinates. Also, with reference to the estimated result, the position of the image sensor can be calibrated.

The method and apparatus for calibrating the position of an image sensor, and the method of detecting the position of an image sensor according to the present invention will now be described in more detail with reference to the accompanying drawings, in which exemplary embodiments of the invention are shown.

Figure 5:
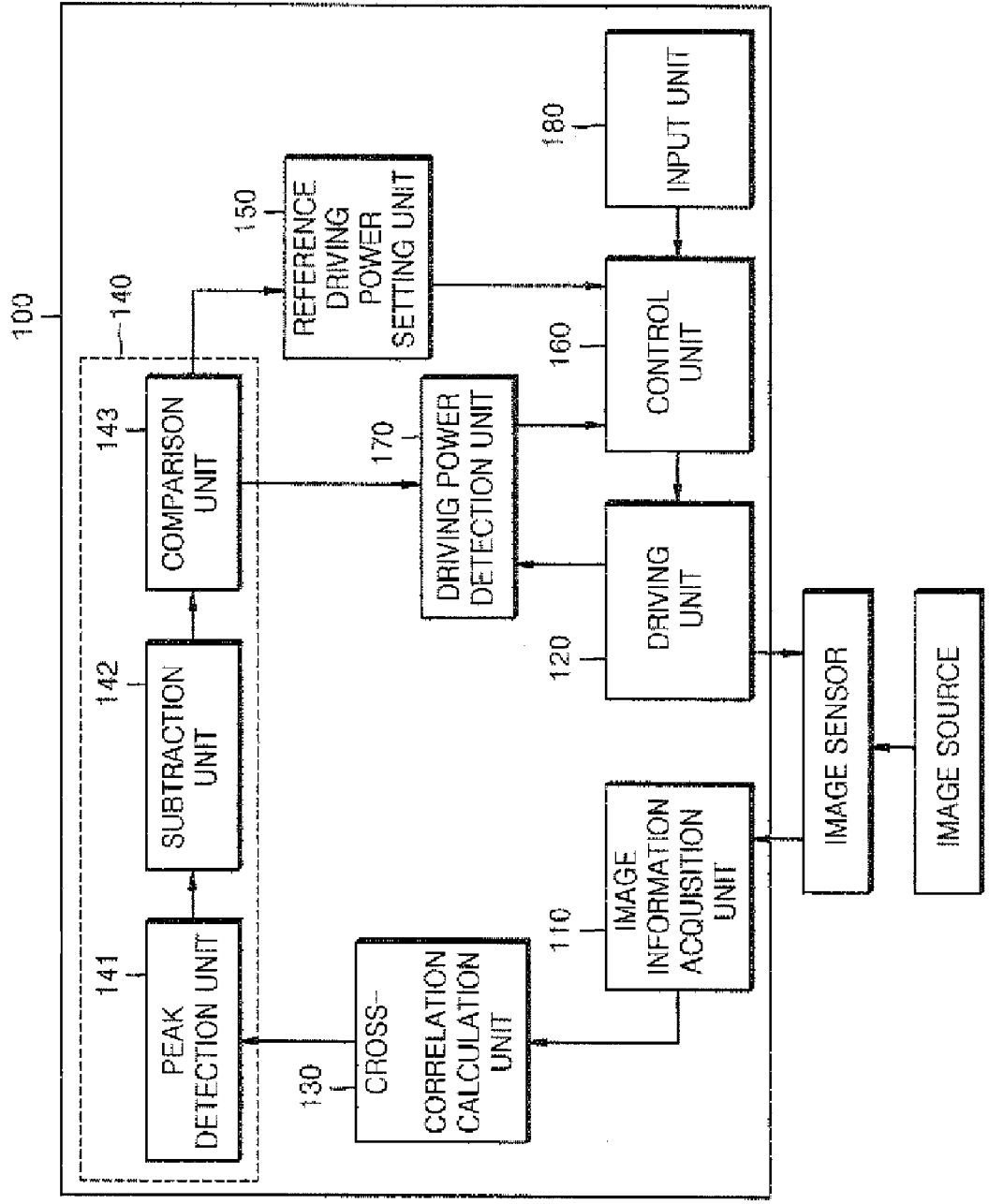
FIG. 5 is a diagram illustrating an apparatus for calibrating a position of an image sensor according to an exemplary embodiment of the present invention.

FIG. 5 is a diagram illustrating the apparatus 100 for calibrating the position of an image sensor according to an exemplary embodiment of the present invention.

The apparatus 100 for calibrating the position of an image sensor according to the current exemplary embodiment is composed of an image information acquisition unit 110, a driving unit 120, a cross-correlation calculation unit 130, a symmetry determination unit 140, a reference driving power setting unit 150, a control unit 160, a driving power detection unit 170 and an input unit 180.

Figure 1B:
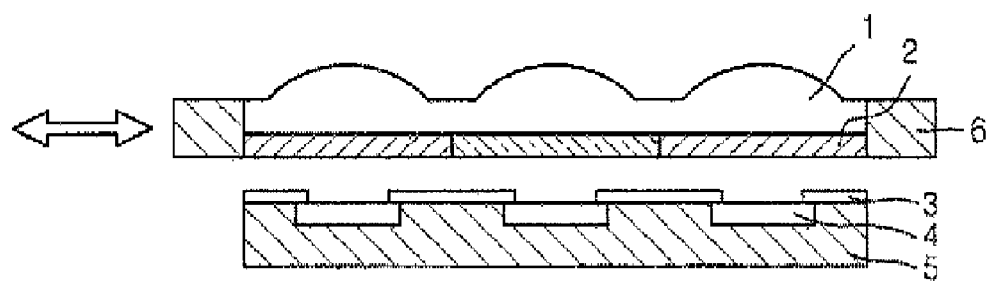
Figure 1C:
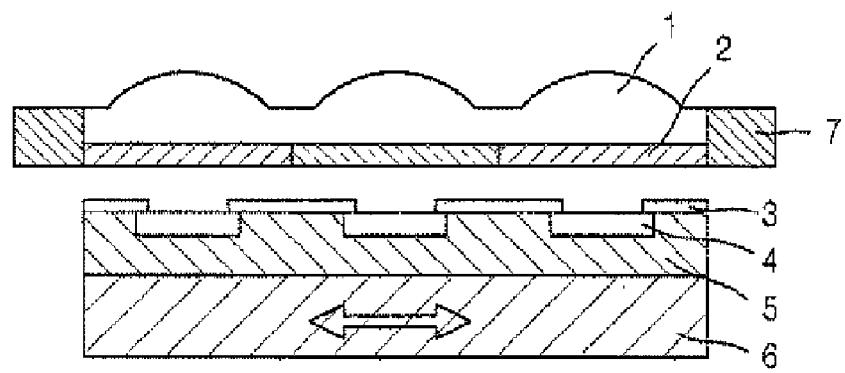

The image information acquisition unit 110 obtains image information sensed from an image source by an image sensor as illustrated in FIGS. 1A through 1C. Examples of image sources that can be used by the apparatus 100 for calibrating a position of an image sensor according to the current exemplary embodiment are light emitted internally or externally and heat provided from a heat source. In an environment in which it is difficult to sense light, a cross-correlation value can be obtained by using image information obtained from heat from the heat source.

The image information acquisition unit 110 obtains from the image sensor first image information, which is sensed from a first position of an image (the original position), and second image information obtained from a second position of the image through manipulation of the driving unit 120. The second position varies depending on a driving power applied to the driving unit 120 controlled by the control unit 160, and the image sensor updates the second image information according to changes in the second position.

The driving unit 120 receives the driving power (voltage source) applied by the control unit 160, and moves the image sensor in a single dimensional or multi-dimensional (2-dimensional or 3-dimensional) space. In the current exemplary embodiment, the driving unit 120 moves the image sensor in proportion to the driving power applied by the control unit 160, and thus, controlling the driving power can control the position of the image sensor.

According to the manipulation of the driving unit 120, the image sensor obtains the first image information from the first position of the image, and obtains the second image information from the second position of the image according to the driving power applied by the driving unit 120 to the image sensor.

The cross-correlation calculation unit 130 calculates the cross-correlation between the first image information and the second image information of the image information acquisition unit 110. According to Equation 1 described above, the cross-correlation calculation unit 130 calculates a cross-correlation value. If the second image information is updated according to changes in the second position of the image sensor, the cross-correlation calculation unit 130 calculates the cross-correlation value by using the updated second image information.

The symmetry determination unit 140 determines whether or not the cross-correlation values calculated in the cross-correlation calculation unit 130 have a symmetric distribution. The symmetry determination unit 140 includes a peak detection unit 141, a subtraction unit 142, and a comparison unit 143.

The peak detection unit 141 detects the peak coordinates of the cross-correlation values of the position of the image sensor, by using the output values of the cross-correlation calculation unit 130. The subtraction unit 142 calculates the difference between cross-correlation values of a pair of points adjacent to the peak coordinates and facing each other centering relative to the peak coordinates. The comparison unit 143 determines whether or not the absolute value of the difference between the cross-correlation values of the pair of points adjacent to the peak coordinates is less than a predetermined value. If the absolute value of the difference between the cross-correlation values of the pair of points adjacent to the peak coordinates is less than the predetermined value, it means that the cross-correlation values of the pair of points adjacent to the peak coordinates are symmetrical about the peak line of the peak coordinates, and if the absolute value is greater than the predetermined value, it means that the cross-correlation values are not symmetrical about the peak line of the peak coordinates.

The symmetry of the cross-correlation values about the peak line of the peak coordinates is a phenomenon that occurs when the position of the image sensor is moved an N-pixel distance (N is an integer), for example, a 0-pixel, 1-pixel, or 2-pixel distance.

Accordingly, by detecting the position of the image sensor at which the cross-correlation values are symmetrical, one-pixel distance can be determined without using a position sensor. Since it is actually difficult to have completely identical cross-correlation values of two points facing each other centering around peak coordinates due to the environment of using the image sensor or operational errors of the image sensor, the comparison unit 143 determines in terms of symmetry that the symmetry is satisfied if the absolute value of the difference between the cross-correlation values of the pair of points adjacent to the peak coordinates is within an allowable symmetry error range (a predetermined value).

An inequality for determining the symmetry of the cross-correlation values of the pair of points adjacent to the peak coordinates is as Equation 2 below:

$$|X_{fg}(m-i,n) - X_{fg}(m+i,n)|/X_{fg}(m,n) < \epsilon_x$$

$$|X_{fg}(m,n-i) - X_{fg}(m,n+i)|/X_{fg}(m,n) < \epsilon_y \qquad \text{EQN. (2)}$$

Here, (m,n) are peak coordinates at which the cross-correlation value has a peak value, (m+i,n) and (m−i, n), and (m,n+i) and (m,n−i) are points facing each other centering around the peak coordinates, and $X_{fg}(m,n)$ is the maximum cross-correlation value at the peak coordinates. With Equation 2, it can be determined whether or not a value obtained by dividing the difference between the coordinates of two points facing each other centering around peak coordinates (m,n) by the maximum cross-correlation value $X_{fg}(m,n)$ is within an allowable symmetry error range ($\epsilon_x$, $\epsilon_y$).

If the difference between the cross-correlation values is within the allowable symmetry error range, the reference driving power setting unit 150 sets the driving power value required for moving the image sensor from the first position to the second position as a reference driving power value in the reference driving power setting unit 150. Then, the driving power value is obtained from the driving power detection unit 170 by the control unit 160.

The control unit 160 calculates the relationship between the position of the image sensor and the driving power value by using the reference driving power value, and applies a driving power to the driving unit 120, which is required for calibrating the position of the image sensor, thereby calibrating the position of the image sensor to a desired position.

Initially, in order to obtain the driving power (reference value) required for moving the image sensor from the first position to the second position, which is a position arrived at by shifting the image sensor one-pixel distance, the control unit 160 provides a plurality of preset driving power values different from each other to the driving unit 120. In the current exemplary embodiment, in order to more accurately obtain the driving power required for moving the image sensor from the first position to the second position, the control unit 160 provides an approximate driving power value preset in order to move the image sensor from the first position to the second position, which is the position arrived at by shifting the image sensor one-pixel distance, and according to the result in terms of symmetry, the control unit 160 calibrates the driving power, thereby controlling the driving power applied to the driving unit 120.

The driving power needs calibrating due to the fact that the driving power value that is required depends on the environment of using the image sensor and/or possible operational errors. As a result, according to the calibration of the driving power, a process in which the driving unit 120 changes the position of the image sensor is repeatedly performed, the cross-correlation calculation unit 130 calculates the cross-correlation value with respect to the changed position, and the symmetry determination unit 140 determines the presence of symmetry.

Also, the control unit 160 obtains from the reference driving power setting unit 150 a reference driving power value obtained when the result of the determination of symmetry satisfies a symmetry condition, that is, when the second position of the image sensor is one-pixel distance from the first position. Then, the control unit 160 calculates an approximate equation with variables of the position of the image sensor and a driving power. If a driving power is applied to the driving unit 120 according to the calculated approximate equation, the position of the image sensor according to the input can be determined.

In the current exemplary embodiment, the position of the image sensor changes in proportion to the driving power value. Accordingly, if the position of the image sensor in which the cross-correlation values are symmetrical and the driving power value at that time are determined, a value obtained by multiplying the determined driving power value by 1/R (R is a real number) can be set as a driving power value required for moving the image sensor a 1/R-pixel distance. The control unit 160 applies the calculated driving power value to the driving unit 120, thereby moving the position of the image sensor the 1/R-pixel distance.

The driving power detection unit 170 detects the driving power value applied to the driving unit 120. In particular, the driving power detection unit 170 detects the driving power value that is detected at a position in which the image sensor has symmetry as the driving power value (reference value) for moving the position of the image sensor one-pixel distance. In the current exemplary embodiment, the driving unit 120 moves the image sensor in proportion to the driving power, and by detecting the reference driving power value through the driving power detection unit 170, the relationship between the driving power value and the position of the image sensor can be determined.

The input unit 180 receives input information on the amount of movement of the position of the image sensor. In the current exemplary embodiment, the input unit 180 receives a value in units of pixels (1/R) as input information.

Figure 6:
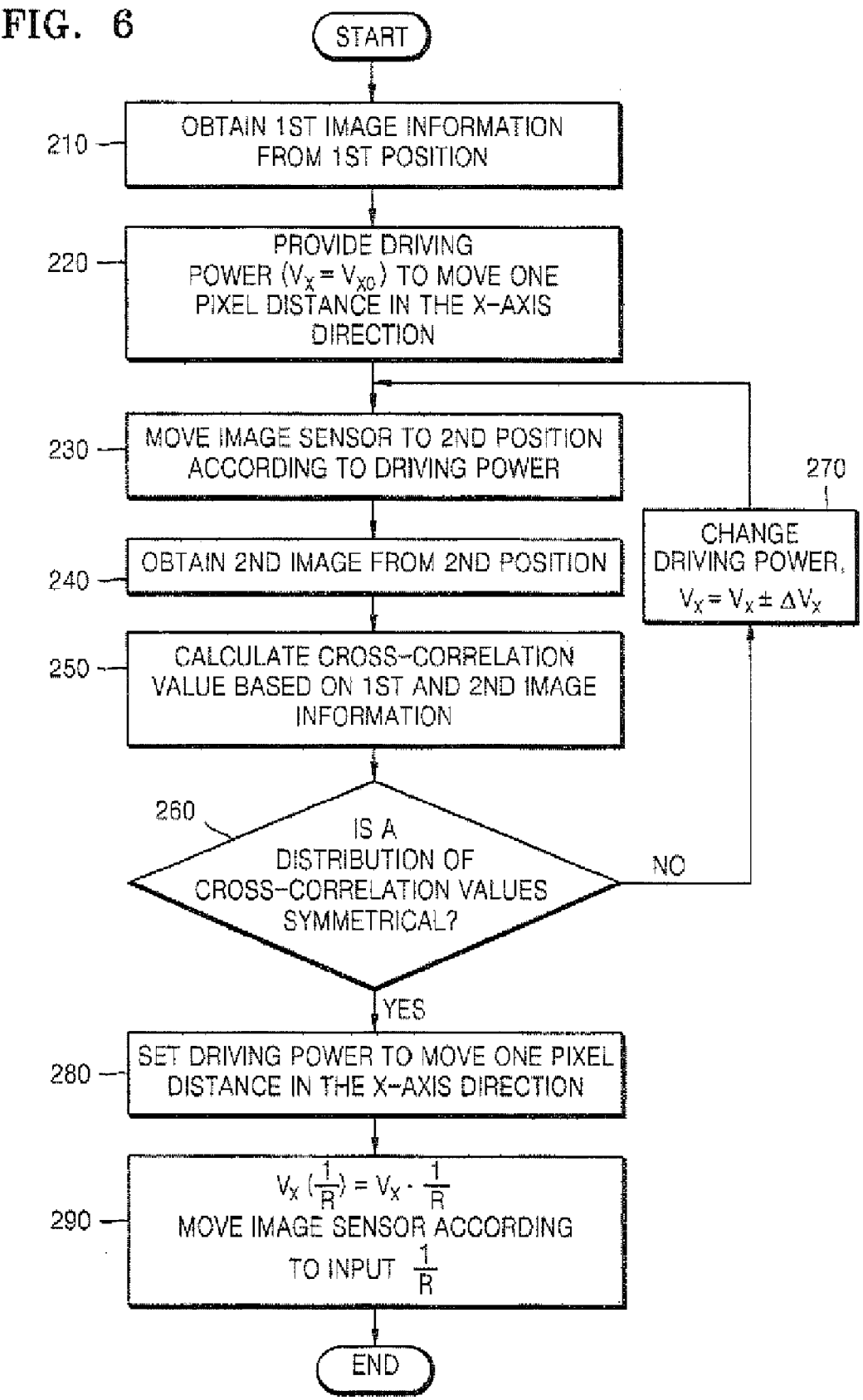
FIG. 6 is a flowchart illustrating a method of calibrating a position of an image sensor according to an exemplary embodiment of the present invention.

FIG. 6 is a flowchart illustrating the method of calibrating the position of an image sensor according to an exemplary embodiment of the present invention. The method of calibrating the position of an image sensor according to the current exemplary embodiment includes operations that are sequentially performed.

In operation 210, the image information acquisition unit 110 obtains first image information of a first position (an original position) from an image source. The image source is generated from a light source disposed inside or outside the apparatus 100 for calibrating the position of the image sensor. The image sensor senses first and second image information from the image source and transfers the first and second image information to the image acquisition unit 110.

In the current exemplary embodiment, the distribution of the light intensity from the image source corresponds to a Gaussian distribution and the light is emitted to the center of the image sensor.

In operation 220, the control unit 160 applies a driving power to the driving unit 120 for moving the image sensor one-pixel distance in the positive direction of the X-axis. In order to move the image sensor one-pixel distance in the positive direction of the X-axis, the control unit 160 applies a preset driving power $V_{x0}$ (in the case of two-axis driving, a preset driving power ($V_{y0}$) preset in order to move the image sensor in the y-axis direction can also be applied) to the driving unit 120, thereby moving the image sensor. In the current exemplary embodiment, the distance between the first position (the original position) of the image sensor to the second position, which is arrived at by moving the image sensor, is in proportion to the driving power applied by the control unit 160. Accordingly, the position of the image sensor can be calibrated by controlling the driving power applied by the control unit 160.

Since the driving power required for moving the image sensor one-pixel distance varies according to the environment of using the image sensor even when the position of the image sensor is moved according to the driving power required for moving the image sensor the one-pixel distance, it is difficult to move the position of the image sensor exactly to one-pixel distance. Thus, calibration of the driving power is required. Due to the calibration of the driving power, in the current exemplary embodiment, the driving power applied to the driving unit 120 continuously changes, thereby changing the driving power applied to the driving unit 120 and changing the position of the image sensor. Then, the cross-correlation values of the position of the image sensor are calculated and the presence of symmetry is determined. This determination process is repeatedly performed in order to calibrate the driving power applied to the driving unit 120.

In operation 230, the driving unit 120 moves the position of the image sensor in the positive direction of the X-axis according to the driving power applied by the control unit 160. A first driving power applied to the driving unit 120 is the preset driving power ($V_x = V_{x0}$) in order to move the image sensor one-pixel distance. When the distribution of the cross-correlation values is symmetrical, the control unit 160 slightly modifies the driving power in operation 270 and applies In operation 240, the image information acquisition unit 110 obtains second image information at the second position (the position after the image sensor moves) from the image sensor. The second position of the image sensor changes by manipulation of the driving unit 120. Whenever the second position is changed, the image sensor updates the second image information. According to the procedure explained below, the cross-correlation values are calculated by using the updated second image information In operation 250, the cross-correlation calculation unit 130 calculates the cross-correlation between the first image information and the second image information according to Equation 1 described above.

In operation 260, the symmetry determination examines whether or not the distribution of the cross-correlation is symmetrical. The symmetry determination unit 140 detects peak coordinates of the cross-correlation values of the position of the image sensor. The peak coordinates become a reference for determining the symmetry of cross-correlation values.

After the peak coordinates are detected in relation to each detected point of peak coordinates, the symmetry determination unit 140 calculates the difference between cross-correlation values of a pair of points adjacent to the peak coordinates and facing each other centering around the peak coordinates. Because of the environment of using the image sensor and operational errors, it is actually difficult to find the position of the image sensor at which the absolute value of the difference between the cross-correlation values is exactly 0. Accordingly, if the absolute value of the difference between the cross-correlation values is within an allowable symmetry error range ($\epsilon_x, \epsilon_y$), the symmetry determination unit 140 determines that condition that the distribution of the cross-correlation is symmetrical is satisfied through Equation 2, which numerically determines the method of determining whether or not the distribution of the cross-correlation values is symmetrical, as explained above.

In operation 270, the control unit 160 continuously changes the driving power $V_{x0}$ applied to the driving unit 120 in operation 220, thereby calibrating the second position of the image sensor. The control unit 160 sets the value of $V_x \pm \Delta V_x$ as a new $V_x$, and applies the new value of the new $V_x$ to the driving unit 120. Here, $\Delta V_x$ is the amount of slight change of the driving power to increase or decrease the driving power in order to move the position of the image sensor according to the determination result in operation 260. In operation 270, the control unit 160 changes the driving power, and the driving unit 120 changes the second position of the image sensor according to the calibrated driving power. According to the changes in the driving power and the position of the image sensor, operations 230 through 260 are performed repeatedly until it is determined that the distribution of the cross-correlation values is symmetrical.

In operation 280, the driving power detection unit 170 detects a driving power value corresponding to the position of the image sensor at which it is determined that the distribution is symmetrical. The reference driving power setting unit 150 sets the driving power value as a reference driving power value. The driving power value detected at the position at which the distribution is symmetrical becomes a reference for moving the image sensor.

In operation 290, the control unit 160 calculates an approximate equation with the position of the image sensor and the driving power value as variables, by using the reference driving power value set in operation 280, and adjusts the position of the image by controlling the driving power value. The control unit 160 estimates the relationship between a driving power required for moving the position of the image sensor a 1/R-pixel distance (R is an integer) and the position of the image sensor according to Equation 3 below:

$$V_x(1/R \text{ pixel shift}) = V_x(1 \text{ pixel shift}) \times 1/R \qquad \text{EQN. (3)}$$

Here, $V_x$(1/R pixel shift) is a driving power for moving the image sensor a 1/R-pixel distance (R is an integer) in X-axis direction.

In the current exemplary embodiment, by using the fact that when the position of the image sensor is moved exactly one-pixel distance, the difference between the cross-correlation values becomes 0 and the position of the image sensor is calibrated. For example, by providing half of driving power required for moving the image sensor one-pixel distance, the image sensor can be moved a ½-pixel distance. The difference between the cross-correlation values has a special distribution even at the position, which is arrived at by moving the image sensor the ½-pixel distance.

Figure 8A:
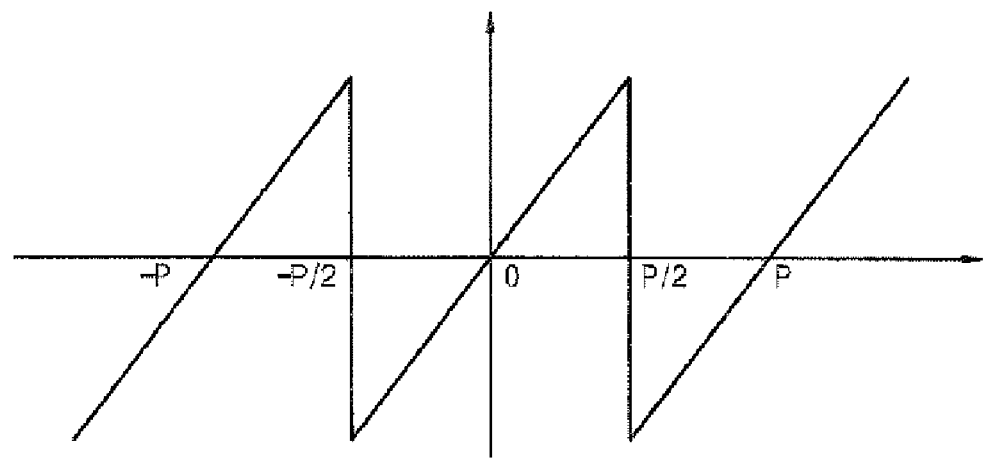
FIGS. 8A and 8B are diagrams illustrating examples of modeling by a method of calibrating the position of an image sensor according to an exemplary embodiment of the present invention.
Figure 8B:
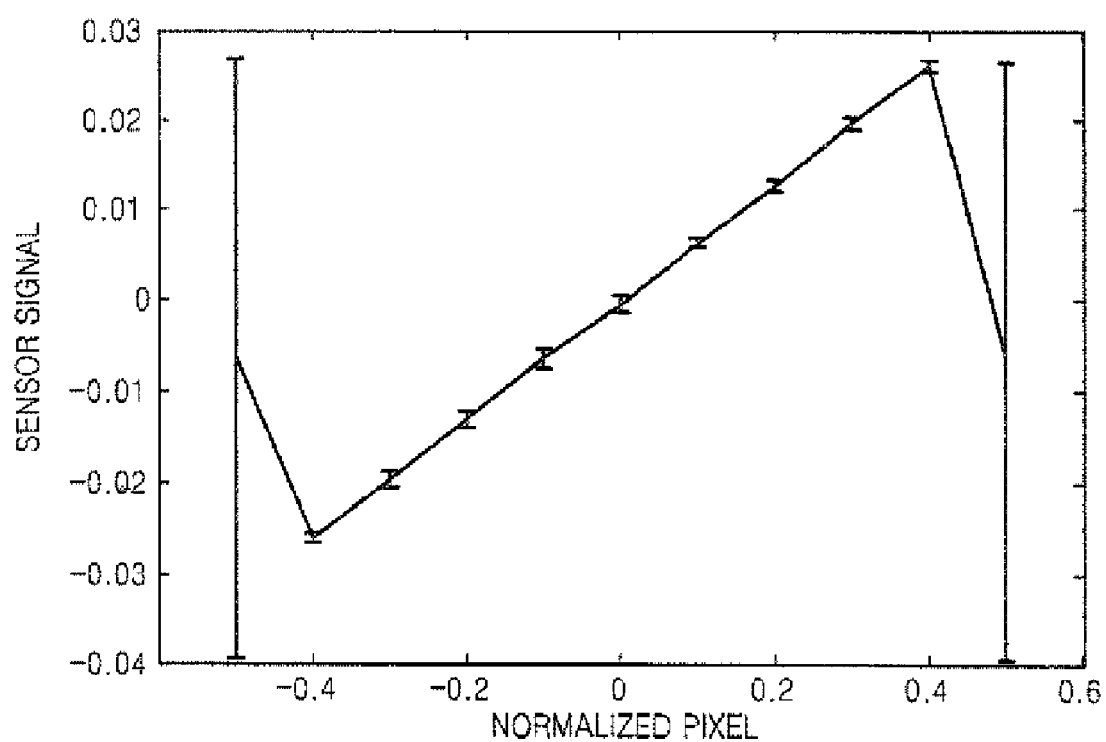

The difference between the cross-correlation values has a maximum value also at the position, which is arrived at by moving the image sensor the ½-pixel distance, as illustrated in FIG. 8A. If the driving power changes slightly, the difference between the cross-correlation values changes greatly as illustrated in FIG. 8B.

In this way, if the driving power at the ½-pixel distance position is taken as a reference driving power value, the accuracy of sensing the position of the image sensor can decrease. Accordingly, the driving power value at the position, which is arrived at by moving the image sensor one-pixel distance, may be used as a reference value.

Figure 7A:
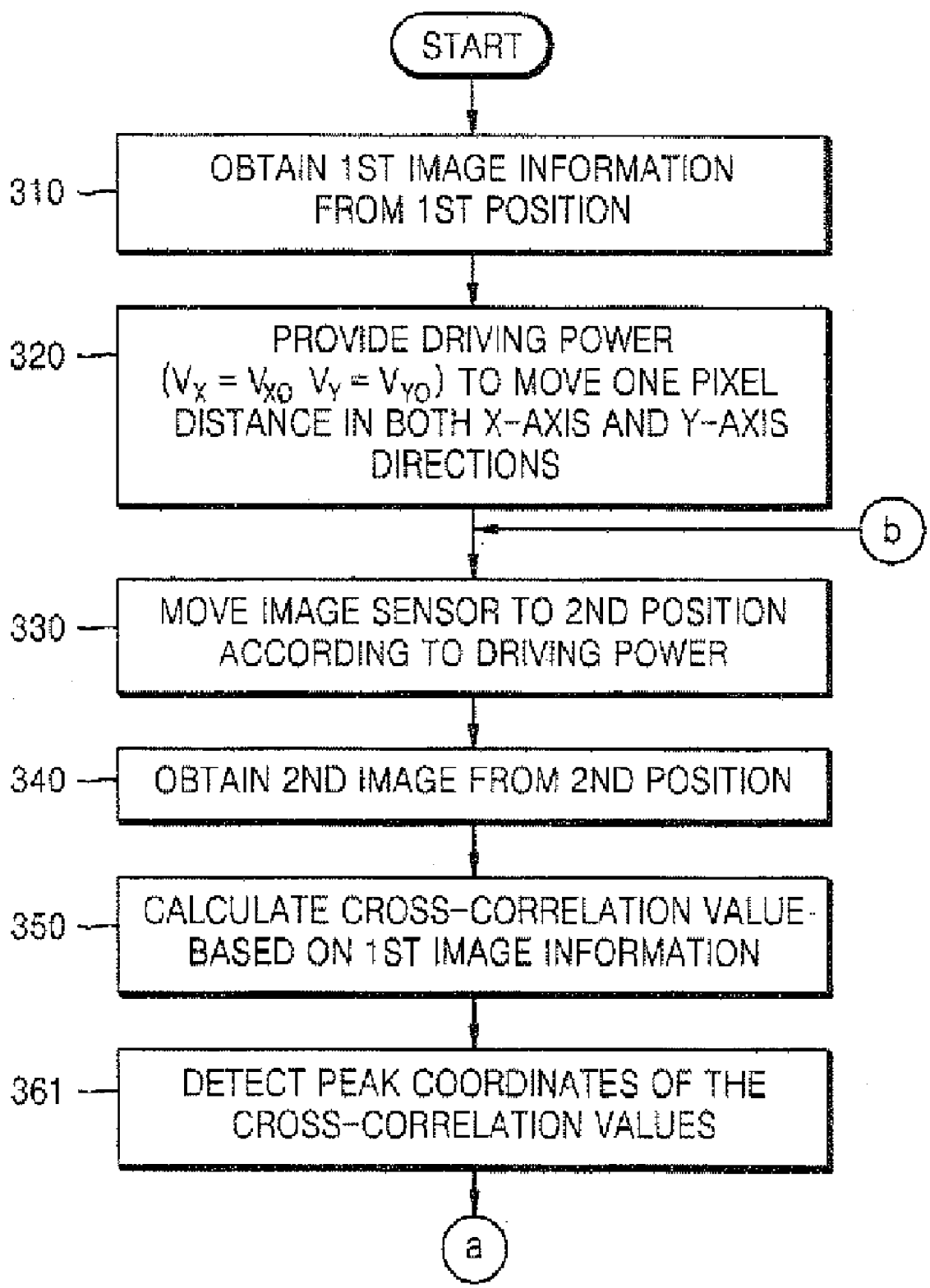
FIGS. 7A and 7B are flowcharts illustrating a method of calibrating a position of an image sensor according to another exemplary embodiment of the present invention.
Figure 7B:
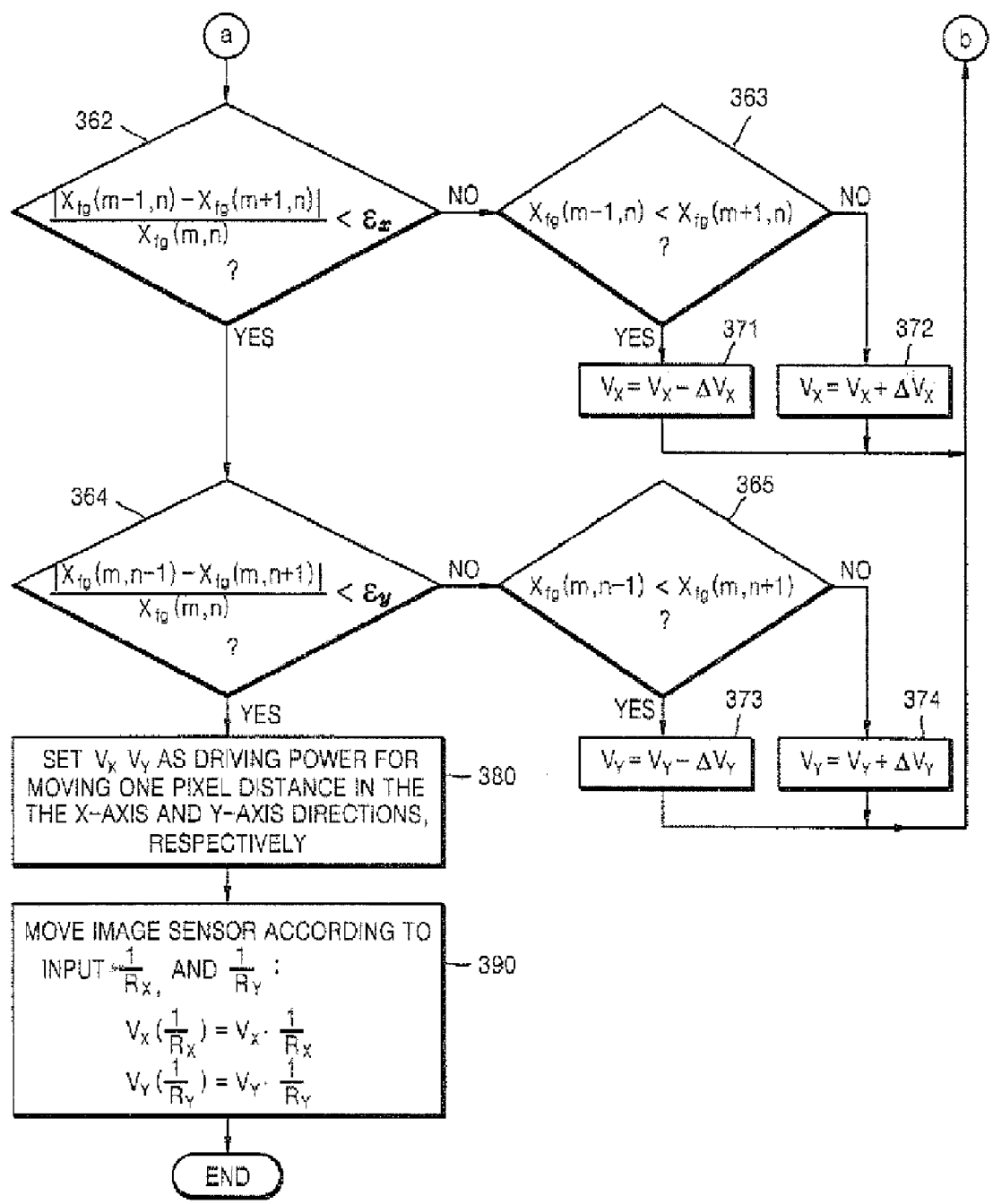

FIGS. 7A and 7B are flowcharts illustrating a method of calibrating the position of an image sensor according to another exemplary embodiment of the present invention.

The previous exemplary embodiment is the method of driving the image sensor with respect to one axis, and the current exemplary embodiment is a method of driving the image sensor with respect to two axes. The basic principle of the current exemplary embodiment is the same as that of the previous exemplary embodiment except that in the current exemplary embodiment, operations 361 through 364 and operations 371 through 374 are further performed and the remaining operations apart from the above-mentioned of the current exemplary embodiment are similar to those of the previous exemplary embodiment. Accordingly, an explanation of the operations that are common to both current and previous exemplary embodiments will be omitted here.

In operation 310, the image information acquisition unit 110 obtains first image information corresponding to the first position from the image sensor.

In operation 320, in order to move the image sensor one-pixel distance in the positive direction of the X-axis, and a one-pixel distance in the positive direction of the Y-axis, the control unit 160 applies a preset driving power ($V_x=V_{x0}$, $V_y=V_{y0}$) to the driving unit 120. Even when the image sensor is moved according to the preset driving power, a calibration of the position of the image sensor, which will be explained later, is required because of the environment of using the image sensor, and operational errors.

In operation 330, the driving unit 120 moves the position of the image sensor in the positive direction of the X-axis and in the positive direction of the Y-axis, according to the preset driving power provided by the control unit 160.

In operation 340, the image information acquisition unit 110 obtains second image information corresponding to the second position after the image sensor is moved, from the image sensor.

In operation 350, the cross-correlation calculation unit 130 calculates the cross-correlation between the first image information and the second image information according to Equation 1 described above.

In operation 361 through 364, it is determined whether or not the distribution of the cross-correlation values is symmetrical (operation 360).

In operation 361, the peak coordinates detection unit 141 detects the peak coordinates of the cross-correlation values of the position of the image sensor.

In operation 362, the subtraction unit 142 performs calculations for dividing the difference between the cross-correlation values of a pair of points adjacent to the detected peak coordinates and facing each other across the peak line by the maximum value of the cross-correlation values according to Equation 2 described above. The comparison unit 143 determines whether or not the condition $|X_{fg}(m,n)-X_{fg}(m+1,n)|/X_{fg}(m,n)<\epsilon$ satisfied. If the condition is satisfied, a driving power value $V_x$ becomes the driving power required for moving the image sensor one-pixel distance in the X-axis direction, and the driving power value $V_x$ is detected by the driving power detection unit 170. If the condition is not satisfied, the comparison unit 143 determines whether or not the condition $X_{fg}(m-,n)<X_{fg}(m+1,n)$ is satisfied in operation 363. The control unit 160 calibrates the driving power value $V_x$ according to the determination result, and applies the calibrated driving power value $V_x$ to the driving unit 120.

In operation 364, the comparison unit 143 determines whether or not the condition $|X_{fg}(m,n-1)-X_{fg}(m,n+1)|/X_{fg}(m,n)<\epsilon_y$ is satisfied. If the condition is satisfied, a driving power value $V_y$ becomes the driving power required for moving the image sensor one-pixel distance in the Y-axis direction, and the driving power value $V_y$ is detected by the driving power detection unit 170. If the condition is not satisfied, the comparison unit 143 determines whether or not the condition $X_{fg}(m,n-1)<X_{fg}(m,n+1)$ is satisfied in operation 365. The control unit 160 calibrates the driving power value $V_y$ according to the determination result, and applies the calibrated driving power value $V_y$ to the driving unit 120.

In operations 371 through 374, the control unit 160 continuously changes the driving power applied in operation 320, thereby calibrating the second position of the image sensor (operation 370).

In operation 371, if the comparison unit 143 determines that $X_{fg}(m-1,n)<X_{fg}(m+1,n)$, the control unit 160 sets $V_x-\Delta V_x$ as $V_x$.

In operation 372, if the comparison unit 143 determines that $X_{fg}(m-1,n)>X_{fg}(m+1,n)$, the control unit 160 sets $V_x+\Delta V_x$ as $V_x$.

In operation 373, if the comparison unit 143 determines that $X_{fg}(m,n-1)<X_{fg}(m,n+1)$, the control unit 160 sets $V_y-\Delta V_y$ as $V_y$.

In operation 374, if the comparison unit 143 determines that $X_{fg}(m,n-1)>X_{fg}(m,n+1)$, the control unit 160 sets $V_y+\Delta V_y$ as $V_y$.

In operations 371 through 374, the driving powers $V_x$ and $V_y$ are changed by the control unit 160, and until the distribution of the cross-relational values are symmetrical, operations 330 through 360 depending on the changed driving power are repeatedly performed.

In operation 380, the driving power value detection unit 170 detects a driving power value corresponding to the position of the image sensor in which it is determined in operations 362 and 364 that the distribution of the cross-correlation values is symmetrical. The reference driving power setting unit 150 sets the detected driving power value as a reference driving power value ($V_x$, $V_y$) for moving the position of the image sensor one-pixel distance.

In operation 390, the control unit 160 calculates an approximate equation as Equation 4 below with the position of the image sensor and the driving power value as variables, by using the reference driving power values ($V_x$, $V_y$) set in operation 380, and adjusts the position of the image by controlling the driving power values.

$$V_x(1/R_x \text{ pixel shift}) = V_x(1 \text{ pixel shift}) \times 1/R_x$$

$$V_y(1/R_y \text{ pixel shift}) = V_y(1 \text{ pixel shift}) \times 1/R_y \quad \text{EQN. (4)}$$

Here, $V_x(1/RX$ pixel shift) is a driving power for moving the image sensor a $1/R_x$-pixel distance in the X-axis direction, and $V_y(1/R_y$ pixel shift) is a driving power for moving the image sensor a $1/R_y$-pixel distance in the Y-axis direction.

FIGS. 8A and 8B are diagrams illustrating examples of modeling by a method of calibrating the position of an image sensor according to an exemplary embodiment of the present invention. The method of calibrating the position of the image sensor according to the exemplary embodiment described above calibrates the position of the image sensor by using Equation 4, that is an approximating equation and the method of detecting the position of the image sensor estimates the position of the image sensor by using Equation 5 (see below) that is an approximating equation. However, the process of determining a driving power value required for moving the position of the image sensor one-pixel distance is the same in both methods. Accordingly, an explanation of the method of obtaining a reference driving power value that is a driving power value will be omitted here.

FIG. 8A illustrates an ideal model for detecting the position of an image sensor.

In FIG. 8A, an x-coordinate of a point is the position of the image sensor and the y-coordinate is the difference between the cross-correlation values. By considering that the position of the image sensor changes in proportion to the driving power and the distribution characteristic of the difference between the driving power and the cross-correlation values is an iterative sawtooth, the relationship between the position of the image sensor and the difference between the cross-correlation values is generalized as Equation 5 below:

$$\hat{x} = \sum_{i=1}^{N} a_i X_{fg}(m-i, n) - \sum_{i=1}^{N} a_i X_{fg}(m+i, n) \quad \text{EQN. (5)}$$

$$\hat{y} = \sum_{i=1}^{N} b_i X_{fg}(m, n-i) - \sum_{i=1}^{N} b_i X_{fg}(m, n+i)$$

Here, $\hat{x}$ and $\hat{y}$ are coordinates of the second position of the image sensor, $X_{fg}$ is the cross-correlation functions between image information f and g, (m,n) is the coordinates in which the cross-correlation value is a maximum, N is the number of pairs of points used for examining the presence of a symmetry among pairs of points adjacent to the coordinates in which the cross-correlation value is the maximum, and $a_i$ and $b_i$ are constant indicating weight values.

Assuming that N=1, $a_i$=1, and $b_i$=1 in Equation 5, and if the difference value of the cross-correlation values is divided by the maximum cross-correlation value $X_{fg}(m,n)$, Equation 5 can be simplified as Equation 6 below:

$$\hat{x}_N = \{X_{fg}(m-1,n) - X_{fg}(m+1,n)\}/X_{fg}(m,n)$$

$$\hat{y}_N = \{X_{fg}(m,n-1) - X_{fg}(m,n+1)\}$$

$$/X_{fg}(m,n) \quad \text{EQN. (6)}$$

Here, $\hat{x}_N$ and $\hat{y}_N$ are normalized estimated position values.

FIG. 8B illustrates the estimated position values of the image sensor according to Equation 6, after calculating the differences of the cross-correlation values while moving the position of the image sensor (distances of . . . −0.5, −0.4, −0.3, −0.2, −0.1, 0, 0.1, 0.2, 0.3, 0.4, and 0.5 pixels).

As illustrated in FIG. 8B, since an inaccurate reference value is obtained around a 0.5-pixel distance, it is difficult to accurately detect the position of the image sensor when the image sensor is at the position, which is arrived at by moving the 0.5-pixel distance. However, even in this case, it can be detected that the image sensor is at the position, which is arrived at by moving the 0.5-pixel distance, by using the characteristic of the cross-correlation values at the position. That is, as illustrated in FIG. 8A, by using the fact that the difference of the cross-correlation values has a maximum value at the position, which is arrived at by moving the image sensor the 0.5-pixel distance, it can be detected that the image sensor is at the position, which is arrived at by moving the image sensor the 0.5-pixel distance.

According to the exemplary embodiment of the present invention as described above, by using the symmetric distribution characteristic of the cross-correlation of the position of the image sensor, the position of the image sensor is tracked, thereby calibrating and detecting the position of the image sensor in units of subpixels even without using a separate position sensor. Also, according to the present invention, the amount of complicated calculations related to the calibration and detection of the position of the image sensor can be reduced, and the accuracy of sensing the position of the image sensor in units of subpixels can be improved.

While the present invention has been particularly shown and described with reference to exemplary embodiments thereof, it will be understood by one of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of calibrating a position of an image sensor, the method comprising:

obtaining first image information corresponding to a first position of the image sensor and obtaining second image information corresponding to a second position of the image sensor;

calculating cross-correlation values between the obtained first image information and second image information;

determining whether the calculated cross-correlation values are symmetrical;

setting a driving power value of the image sensor for moving the image sensor a distance from the first position to the second position as a reference driving power value for moving the image sensor one-pixel distance if the calculated cross-correlation values are symmetrical; and calibrating a position of the image sensor by using the set driving power value.

2. The method of claim 1, further comprising applying driving power values, thereby changing the second position if the cross-correlation values are not symmetrical, wherein for each of the changed second positions, the obtaining of the second position of the image sensor, the calculating of the cross-correlation values, and the determining of whether or not the calculated cross-correlation values are symmetrical are performed.

3. The method of claim 1, wherein the determining of whether the calculated cross-correlation values are symmetrical comprises:
  detecting peak coordinates of the cross-correlation values; and
  determining whether the cross-correlation values are symmetrical relative to the detected peak coordinates.

4. The method of claim 1, wherein the determining of whether the calculated cross-correlation values are symmetrical comprises:
  detecting peak coordinates of the cross-correlation values;
  calculating a difference between the cross-correlation values of a pair of points facing each other and centering around the detected peak coordinates; and
  examining whether an absolute value of the difference between the cross-correlation values is less than a predetermined value.

5. The method of claim 1, wherein the calibrating of the position of the image sensor comprises:
  calculating a relational equation between the driving power value and the position of the image sensor by using the set reference driving power value; and
  calibrating the position of the image sensor by controlling the driving power value.

6. The method of claim 2, wherein the obtaining of the first image information and the second image information comprises:
  obtaining the first image information corresponding to the first position of the image sensor,
  moving the image sensor to the second position according to the reference driving power value for moving the position of the image sensor one-pixel distance, and
  obtaining the second image information from the second position of the image sensor.

7. The method of claim 4, wherein the examining of whether the absolute value of the difference between the cross-correlation values is less than the predetermined value comprises:
  if the absolute value of the difference between the cross-correlation values is greater than the predetermined value, changing the second position by applying driving power values repeatedly until a new absolute value of a new difference between new cross-correlation values becomes less than the predetermined value, and
  obtaining the second position of the image sensor, the calculating of the cross-correlation values, and the determining of whether the calculated cross-correlation values are symmetrical in each of changed second positions.

8. The method of claim 1, wherein the calibrating of the position of the image sensor by using the set driving power value comprises:
  calculating equations as below relating to the relationship between the driving power value and the position of the image sensor, and
  adjusting the position of the image sensor by controlling the driving power value:

$V_x(1/R \text{ pixel}) = V_x(1 \text{ pixel}) \times 1/R$ $V_y(1/R \text{ pixel}) = V_y(1 \text{ pixel}) \times 1/R$ wherein $V_x(1/R \text{ pixel})$ is a driving power value required for moving the image sensor a 1/R-pixel distance in the X-axis direction, $V_y(1/R \text{ pixel})$ is a driving power value required for moving the image sensor a 1/R-pixel distance in the Y-axis direction, R is a real number, $V_x(1$ pixel) is a reference value required for moving the image sensor one-pixel distance in the X-axis direction, and $V_y(1$ pixel) is a reference value required for moving the image sensor one-pixel distance in the Y-axis direction.

9. The method of claim 1, wherein the calculating of the cross-correlation values between the obtained first image information and second image information comprises calculating the cross-correlation values of the image information according to equation below:

$$X_{fg}(k, h) = f * g = \sum_{i}^{P} \sum_{j}^{Q} f(i, j) \times g(i+k, j+h)$$

wherein f(i,j) is first image information of the first position of the image sensor, g(i+k,j+h) is second image information of the second position which determined by moving the image sensor a distance (k,h), $X_{fg}(k,h)$ is the cross-correlation function between the first image information and the second image information, and P and Q are the numbers of pixels of images of which cross-correlation is to be calculated.

10. An apparatus for calibrating a position of an image sensor, the apparatus comprising:
  an image information acquisition unit which obtains first image information corresponding to a first position of the image sensor and obtains second image information corresponding to a second position of the image sensor;
  a driving unit which changes the second position of the image sensor according to a driving power value;
  a cross-correlation calculation unit which calculates cross-correlation values between the first image information and the second image information;
  a symmetry determination unit which determines whether the cross-correlation values calculated in the cross-correlation calculation unit are symmetrical;
  a reference driving power value setting unit which sets the driving power value of the image sensor for moving the image sensor the distance from the first position to the second position as a reference driving power value for moving the image sensor one-pixel distance if it is determined that the cross-correlation values are symmetrical; and
  a control unit which controls the driving power value to be provided to the driving unit by using the set driving power value.

11. The apparatus of claim 10, further comprising a light source supplying unit which provides an image source to the image sensor.

12. The apparatus of claim 10, further comprising a heat source supplying unit which provides an image source to the image sensor.

13. The apparatus of claim 10, wherein the symmetry determination unit comprises:
  a peak detection unit which detects peak coordinates of the cross-correlation values of the position of the image sensor;
  a subtraction unit which calculates the difference between the cross-correlation values of a pair of points adjacent to the detected peak coordinates and facing each other and centering around the peak coordinates; and
  a comparison unit which examines whether an absolute value of the difference between the cross-correlation values is less than a predetermined value.

14. The apparatus of claim 10, wherein the control unit comprises:
   an approximate equation calculation unit which calculates an approximate equation with the position of the image sensor and the driving power value as variables based on the set reference driving power value; and
   a first driving power calibration unit which adjusts the image sensor by controlling the driving power value according to the calculated approximate equation.

15. The apparatus of claim 14, wherein the control unit further comprises a second driving power calibration unit which calibrates the driving power applied to the driving unit so the absolute value of the difference between the cross-correlation values is less than the predetermined value.

16. A method of detecting a position of an image sensor, the method comprising:
   obtaining first image information corresponding to a first position of the image sensor and obtaining second image information corresponding to a second position of the image sensor;
   calculating the cross-correlation values between the obtained first image information and second image information;
   determining whether or not the calculated cross-correlation values are symmetrical;
   setting a driving power value of the image sensor for moving the image sensor the distance from the first position to the second position as a reference driving power value for moving the image sensor one-pixel distance if it is determined that the cross-correlation values are symmetrical; and
   detecting the position of the image sensor by using the set driving power value.

17. The method of claim 16, further comprising applying new driving power values, thereby having changed the second positions if it is determined that the cross-correlation values are not symmetrical,
   wherein for each of the changed second positions, the obtaining of the second position of the image sensor, the calculating of the cross-correlation values, and the determining of whether the calculated cross-correlation values are symmetrical are performed.

18. The method of claim 17, wherein the determining of whether the calculated cross-correlation values are symmetrical comprises:
   detecting peak coordinates of the cross-correlation values;
   calculating a difference between the cross-correlation values of a pair of points facing each other and centering around the detected peak coordinates; and
   examining whether an absolute value of the difference between the cross-correlation values is less than a predetermined value.

19. The method of claim 18, wherein the position of the image sensor is detected based on a calculated approximate equation of the position of the image sensor,
   wherein the difference between the cross-correlation values is calculated by using a relation between the detected driving power value and the position of the image sensor and a relation between the detected driving power value and the difference between the cross-correlation values.

20. The method of claim 19, wherein the calculated approximate equation is expressed as equations below:

$$\hat{x} = \sum_{i=1}^{N} a_i X_{fg}(m-i, n) - \sum_{i=1}^{N} a_i X_{fg}(m+i, n)$$

$$\hat{y} = \sum_{i=1}^{N} b_i X_{fg}(m, n-i) - \sum_{i=1}^{N} b_i X_{fg}(m, n+i)$$

where $\hat{x}$ and $\hat{y}$ are coordinates of the second position of the image sensor, $X_{fg}$ is the cross-correlation function between image information f and g, (m,n) is the coordinates in which the cross-correlation value is a maximum, N is the number of pairs of points used for examining the presence of symmetry among pairs of points adjacent to the coordinates in which the cross-correlation value is the maximum, and $a_i$ and $b_i$ are constants indicating weight values.

* * * * *